United States Patent
Nakamura

(10) Patent No.: US 6,924,936 B2
(45) Date of Patent: Aug. 2, 2005

(54) LIGHT SCANNING APPARATUS AND TWO-DIMENSIONAL IMAGE FORMING APPARATUS

(75) Inventor: Akira Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 10/449,253

(22) Filed: May 29, 2003

(65) Prior Publication Data

US 2004/0036984 A1 Feb. 26, 2004

(30) Foreign Application Priority Data

May 31, 2002 (JP) ....................................... 2002-159274

(51) Int. Cl.[7] .............................................. G02B 27/14
(52) U.S. Cl. ....................... 359/633; 359/223; 359/572; 359/627; 348/203
(58) Field of Search ................................ 359/237, 245, 359/261, 315, 317, 627, 629, 633, 850, 857, 861, 197, 204, 212, 223, 224, 225, 572; 348/203

(56) References Cited

U.S. PATENT DOCUMENTS

| | | | | |
|---|---|---|---|---|
| 3,748,015 A | * | 7/1973 | Offner .......................... | 359/366 |
| 5,063,586 A | * | 11/1991 | Jewell et al. .................. | 378/34 |
| 5,153,898 A | * | 10/1992 | Suzuki et al. ................. | 378/34 |
| 5,220,590 A | * | 6/1993 | Bruning et al. ............... | 378/34 |
| 5,311,360 A | * | 5/1994 | Bloom et al. ................. | 359/572 |
| 5,353,322 A | * | 10/1994 | Bruning et al. ............... | 378/34 |
| 5,410,434 A | * | 4/1995 | Shafer .......................... | 359/858 |
| 5,982,553 A | | 11/1999 | Bloom et al. ................. | 359/627 |
| 2004/0061916 A1 | * | 4/2004 | Kuba ........................... | 359/205 |
| 2004/0109219 A1 | * | 6/2004 | Kikuchi ....................... | 359/246 |
| 2004/0223126 A1 | * | 11/2004 | Hatakeyama et al. ....... | 353/122 |
| 2004/0257664 A1 | * | 12/2004 | Hashimoto et al. ......... | 359/636 |
| 2005/0041220 A1 | * | 2/2005 | Sunaga ........................ | 353/99 |

FOREIGN PATENT DOCUMENTS

| | | |
|---|---|---|
| EP | 0 252 734 | 1/1988 |
| EP | 1 225 470 | 7/2002 |
| JP | 2001-281583 | 10/2001 |
| JP | 2002-62499 | 2/2002 |

* cited by examiner

*Primary Examiner*—Ricky L. Mack
(74) *Attorney, Agent, or Firm*—Frommer Lawrence & Haug LLP; William S. Frommer

(57) ABSTRACT

A one-dimensional image is formed by reflecting the light from a one-dimensional display device having a plurality of light emitting sections or light emitting sections disposed in one direction by a projection optical system three times or more. Then, a two-dimensional image is obtained by optically scanning the one-dimensional image by a light deflection means in a surface including a direction perpendicular to the disposing direction of the light emitting sections or the light emitting sections in the one-dimensional display device. A magnification projecting system is provided to project the two-dimensional image by magnifying it as it is as an intermediate image. A requirement for high resolution can be coped with by employing the one-dimensional display device as well as a small and less expensive light scanning apparatus and two-dimensional image forming apparatus can be realized thereby.

14 Claims, 14 Drawing Sheets

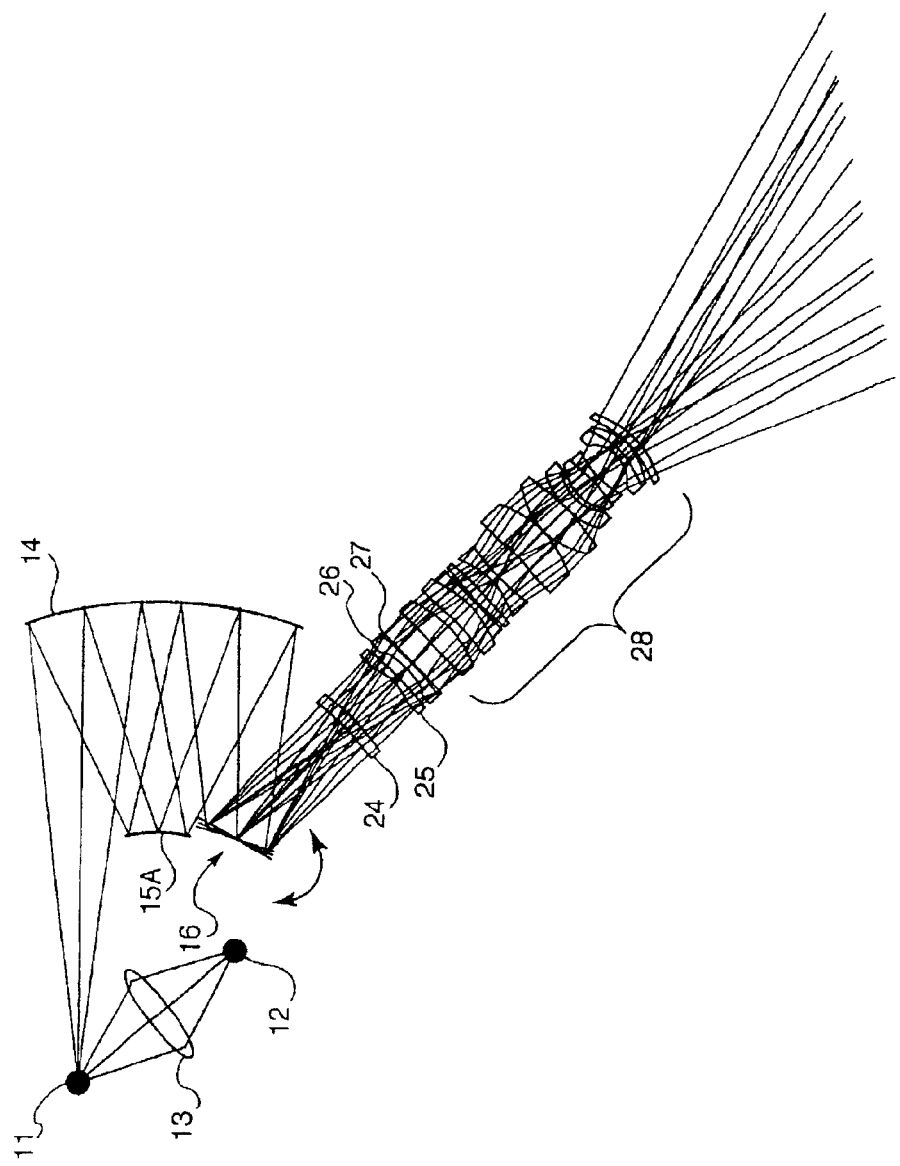

LIGHT SCANNING APPARATUS AND TWO-DIMENSIONAL IMAGE FORMING APPARATUS

BACKGROUND OF THE INVENTION

1. Field of the Invention

The present invention relates to a technology for forming a two-dimensional image using a one-dimensional display device having light emitting sections or light modulating sections disposed in a predetermined direction in correspondence to a one-dimensional pixel line. This technology can be applied to, for example, an image display apparatus (projector apparatus) for projecting an image on a screen in a magnified form.

2. Description of the Related Art

There have been proposed and commercially used various kinds of arrangements of a projector apparatus for projecting an image in a magnified form using a two-dimensional display device such as a liquid crystal light valve and the like and using a projecting system.

In recent years, high resolution is increasingly required to introduce a new broadcasting system, to improve an image processing speed in step with an advance of an arithmetic operation device, and to convert a conventional mode for projecting an image in a magnified form using a film (so-called analog cinema) into a mode utilizing digital signal processing (digital cinema).

However, it is difficult for the two-dimensional display device to keep pace with the tendency for high resolution because of the drawbacks thereof resulting from an increase in the number of pixels and miniaturization of a pixel size.

When it is intended to achieve high resolution by, for example, increasing the (total) number of pixels while fixing a size of a display device, an open portion of a display cannot help being reduced, thereby brightness is sacrificed (it is difficult to realize a bright projector apparatus). In contrast, when it is intended to achieve high resolution while fixing a pixel size, a drawback occurs in that a size of a display device is indispensably increased, from which an apparatus including an optical system is increased in size and made expensive.

Note that a reduction in a pixel size requires a countermeasure for preventing smaller foreign substances from being mixed into the display device in a manufacturing process thereof. Further, an increase in size of the display device requires to increase a size of a manufacturing apparatus itself.

Thus, when there is employed an arrangement for executing scanning in a predetermined direction using a one-dimensional display device, it is possible to greatly reduce the number of pixel trains of the device.

As an example, when a two-dimensional display device is used in an very fine television or an advanced television, that is, a so-called high definition television, the number of sections as many as 2,070,000 pixels ($\approx$1920×1080), whereas, in a system in which scanning is executed in a horizontal (H) direction using a one-dimensional display device, the high definition television can be realized by the number of elements as large as 108,000 pixels, from which it is apparent that the one-dimensional display device is superior to the two-dimensional display device.

A grating light valve (GLV) of Silicon Light Machines, U.S.A., for example, is known as the one-dimensional display device (refer to U.S. Pat. No. 5,311,360). Note that the grating light valve is composed of a phase reflection type diffraction grating formed by making best use of a technology for a micro electromechanical system (MEMS).

When the grating light valve is used as a one-dimensional light modulating device together with an illuminating light system for irradiating light to the grating light valve, diffraction gratings constituting respective pixels can be mechanically operated based on an image signal, and the grating light valve can be acted as a image display device by controlling a phase difference of light resulting from the operation of the diffraction gratings. In this case, an image can be formed by using a Schlieren optical system as an optical system in order to separate ± first order diffracted light and zero order diffracted light from the diffraction gratings constituting the respective pixels and to cut off one of the diffracted light (off light).

When a projector optical system is employed in a display apparatus with a large screen using the one-dimensional display device, a projection lens is provided with the one-dimensional display device and a light deflection device is provided to deflect the light passing through the lens as shown in U.S. Pat. No. 5,982,553, National Publication No. 2000-513114, and the like. That is, after a one-dimensional intermediate image from the one-dimensional display device is projected in a magnified form by the projection lens, a two-dimensionally projected image can be obtained on a screen by optically scanning the projected image by a light deflection device disposed at the pupil position of the projection lens or in the periphery thereof.

However, in the conventional arrangement, the following problems arise as to an increase in size, complexity, and the like of the apparatus.

For example, a size of the projection lens is increased because the pupil position of the projection lens, which projects the one-dimensional intermediate image in a magnified form, is disposed at a position apart from the lens to reduce a load on the light deflection device. Further, when a variable power function is added to the projection lens, a scanning angle must be changed in correspondence to variable power, which will make a system arrangement complex.

In addition to the above mentioned, problems resulting from the conventional arrangement will arise in strain of an image. For example, in a system arranged such that a position of an image projected onto a screen can be adjusted by, for example, shifting an optical axis of a projection lens with respect to the one-dimensional intermediate image, significant strain is caused by the shift of the optical axis. Further, when a projecting distance is short as in a back surface projecting apparatus (so-called rear projector) and the like, an adverse effect due distortion is increased as well as out of focus occurs on the screen, thereby image quality is deteriorated.

Accordingly, an object of the present invention is to fulfill a requirement for high resolution by using a one-dimensional display device and to realize a light scanning apparatus and a two-dimensional image forming apparatus which are less expensive and small in size.

SUMMARY OF THE INVENTION

To solve the problems described above, an optical scanning apparatus according to the present invention forms a projected image (one-dimensional image) by reflecting the light from a one-dimensional display device having a plurality of light emitting sections or light emitting sections disposed in one direction by a projection optical system three times or more as well as obtains a two-dimensional image by scanning the light outgoing from the projection optical system by a light deflection means in a surface including a direction perpendicular to the disposing direction of the light emitting sections or the light emitting sections in the one-dimensional display device.

A two-dimensional image forming apparatus according to the present invention includes a magnification projecting system for projecting the two-dimensional image obtained by the projection optical system and the light deflection means by magnifying it as an intermediate image.

Therefore, according to the present invention, the two-dimensional image can be obtained by constituting the projection optical system for reflecting the light from the one-dimensional display device as a one-dimensional projection optical system and by optically scanning the one-dimensional image in a direction perpendicular to the disposing direction of the light emitting sections or the light modulating sections in the one-dimensional display device (that is, since the two-dimensional image can be obtained by scanning the one-dimensional image just before it passes through the magnification projecting system, it is possible to magnify and project the two-dimensional image as it is).

BRIEF DESCRIPTION OF THE DRAWINGS

FIG. 14 is a view showing an example of an arrangement of the two-dimensional image forming apparatus (including a magnification projecting system) according to the present invention.

DESCRIPTION OF THE PREFERRED EMBODIMENTS

Figure 1:
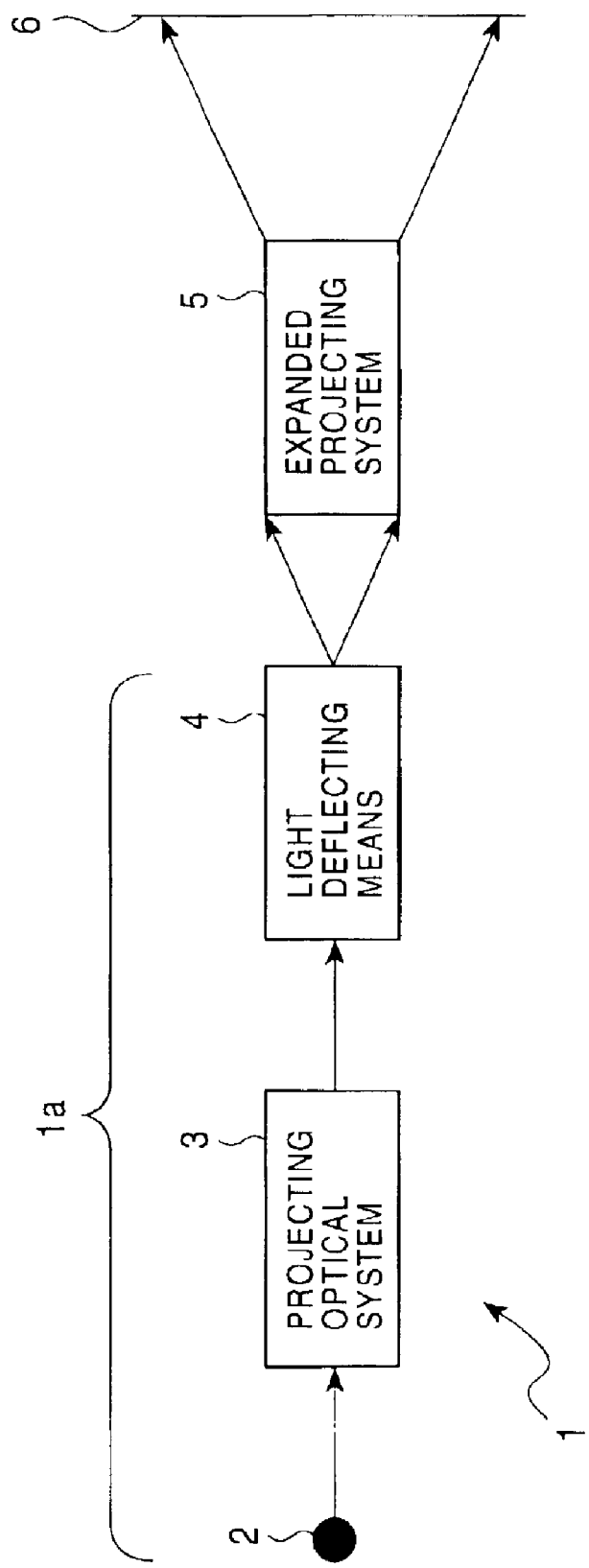
FIG. 1 is a block diagram explaining a basic arrangement of a two-dimensional image forming apparatus according to the present invention.

FIG. 1 is a view explaining a basic arrangement of a two-dimensional image forming apparatus according to the present invention (apparatus for forming a two-dimensional image from a one-dimensional image) including a light scanning apparatus 1a.

The light scanning apparatus 1a includes a one-dimensional display device 2, a projection optical system 3, and light deflection means (or light deflection device) 4.

The one-dimensional display device 2 is composed of a plurality of light emitting sections or light modulating sections disposed in one direction, and the following modes are exemplified as the one-dimensional display device 2.

One-dimensional light emitting display device having a plurality of light emitting sections disposed linearly; and One-dimensional light modulating device having a plurality of light modulating sections disposed linearly.

Note that a phase reflection type diffraction grating represented by, for example, the grating light valve described above, and the like are exemplified as the one-dimensional light modulating device. However, since the light modulating device does not emit light by itself, a light source is necessary (preferably, a coherent light source).

The projection optical system 3 forms a projected image by reflecting light incident from the one-dimensional display device 2 three times or more and is composed of a reflection type one-dimensional projection optical system. For example, an Offner optical system disclosed in U.S. Pat. No. 3,748,015 is exemplified as a basic system for 1:1 projection, and reflection is executed three times in this system. That is, the Offner optical system is composed of a pair of reflectors so that first and third reflections are executed on a coaxial curved surface having the same radius of curvature and a second reflection is executed on a different surface. Note that an optical system advanced from the Offner optical system is shown in, for example, "Optical design using computer graphics" by Joseph, M. Howard, Applied Optics, Vol. 40., No. 19, p3225. Further, as to a reducing or magnifying system employing the reflection type projection optical system, systems in which reflection is executed for example, three times are disclosed in Japanese Patent No. 2,603,225, U.S. Pat. Nos. 5,153,898, 5,220, 590, 5,353,322, and the like, and systems, in which reflection is executed four times are exemplified in U.S. Pat. Nos. 5,063,586 and 5,410,434, Japanese Unexamined Patent Application Publication No. 2000-98227, and the like and an arrangement disclosed in Japanese Unexamined Patent Application Publication No. 9-211322 is exemplified as an example using reflection executed more than four times. Although these examples are shown as the reduction system or the magnification system, the relationship between reduction and magnification is reversed by reversing an object image. Further, in any of the cases, a two-dimensional image can be obtained by executing scanning by light deflection.

Note that the projection optical system 3 basically executes reflection three times or more and can be arranged by individually combining a plurality of reflection means in addition to the Offner optical system, and any of the 1:1 system, reduction system, and magnification system may be employed.

The light deflection means 4 is provided to form the two-dimensional image by scanning the light from the projection optical system 3. That is, the two-dimensional image is obtained by scanning the outgoing light, which is obtained after it is reflected by the projection optical system 3 in a surface including a direction perpendicular to a direction in which the light emitting sections or the light modulating sections are disposed in the one-dimensional display device 2, and a rotary reflector (galvanometer mirror and the like) is exemplified as the light deflection means 4.

The two-dimensional image obtained through the light deflection means 4 is magnified through a magnification projecting system 5 and projected onto a screen 6. That is, the magnification projecting system 5 is an optical system for magnifying and projecting the two-dimensional image obtained by the projection optical system 3 and the light deflection means 4 using it as an intermediate image.

As described above, in the present invention, the two-dimensional image can be obtained by being scanned by the light deflection means 4 before it is processed by the magnification projecting system 5 (by being optically scanned in the direction perpendicular to the disposing direction in the one-dimensional display device 2).

Note that when the one-dimensional light modulating device having the plurality of light modulating sections disposed in one direction is used, the light source is necessary to irradiate light to the one-dimensional light modulating device. Then, the two-dimensional image can be obtained in such a manner that light is irradiated to the one-dimensional light modulating device from the light source and is incident on the projection optical system 3, and the light incident on the projection optical system 3 is reflected thereby three times or more and scanned in the surface including the direction perpendicular to the direction in which the light modulating sections are disposed in the one-dimensional light modulating device.

Figure 2:
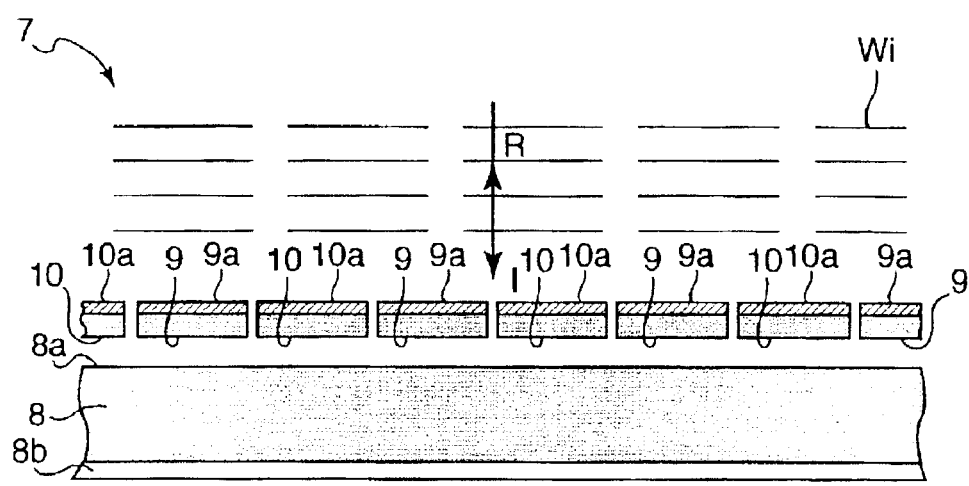
FIG. 2 is a view explaining an operation of a GLV device together with FIG. 3 and shows a non-driven state of the GLV device.
Figure 3:
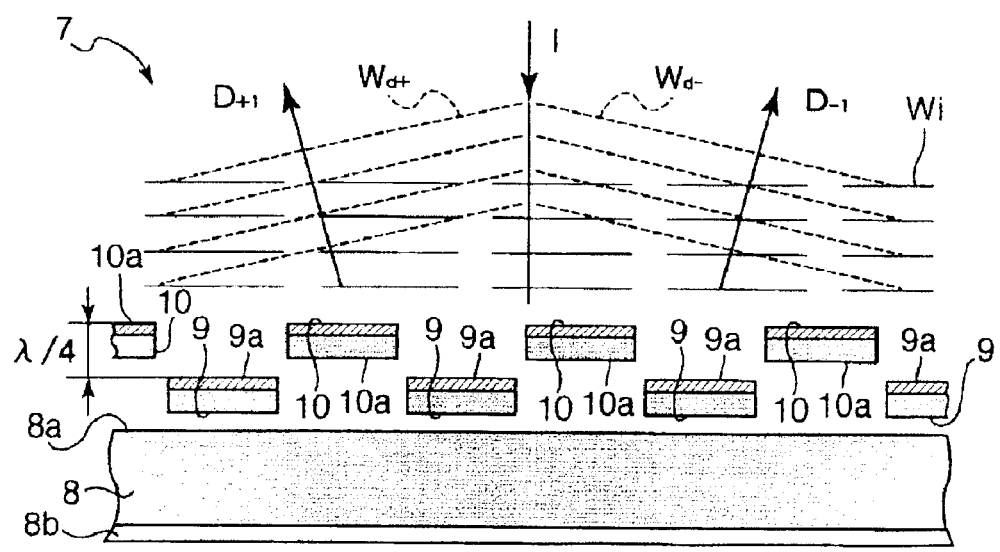
FIG. 3 is a view showing a driven state of the GLV device.

FIGS. 2 and 3 are views for explaining an operation principle of a GLV device 7 as an example of the one-dimensional light modulating device. In FIG. 2, an arrow "I" directed to a substrate 8 shows a direction of incident light and an arrow "R" getting away from the substrate 8 shows a direction of reflected light. Further, in FIG. 3, an arrow "I" directed to the substrate 8 shows an incident direction, an arrow "D+1" shows a direction of +one order diffracted light, and an arrow "D−1" shows a direction of one order diffracted light.

A reflection grating type device is arranged such that many movable gratings 9 and fixed gratings 10 are disposed on the substrate 8 in a predetermined direction, and reflection films are formed on the surfaces of the movable gratings 9 and the fixed gratings 10 disposed alternately, respectively. That is, the movable gratings 9 are arranged as flexible beams (micro bridges) and elastically supported on the substrate 8, the reflection films 9a are formed on the surfaces thereof, and reflection films 10a are formed on the fixed gratings 10.

Then, an electrode layer 8b is formed on a surface of the substrate 8 opposite to a surface 8a above which the movable gratings 9 and the fixed gratings 10 are disposed.

In a state in which no potential difference is applied between the movable gratings 9 and the electrode layer 8b, the height of the movable gratings 9 is aligned with the height of the fixed gratings 10 so that the heights of the reflection surfaces thereof (distances thereof from the substrate 8) are in agreement with each other as shown in FIG. 2, thereby no diffracting action occurs. Accordingly, wavefronts Wi, which are shown by broken lines in parallel to the surface 8a, of light incident from the direction "I" are reflected in the direction "R" as regularly reflected light, that is, as zero order light.

When a voltage is applied between the movable gratings 9 and the electrode layer 8b, the movable gratings 9 are flexed and drawn toward the substrate 8 side by electrostatic attraction, thereby an optical path difference can be changed. That is, as shown in FIG. 3 in an exaggerated manner, a reflex/diffractive action occurs when the potential difference is applied between the movable gratings 9 and the electrode layer 8b such that the depth of the gratings (the difference between the heights of the movable gratings 9 and the fixed gratings 10) is set to one fourth a light wavelength $\lambda$ ($\lambda/4$) so as to cause the movable gratings 9 to approach to the surface 8a on the substrate 8. The wavefronts Wi of the light incident from the direction "I" are caused to outgo as the wavefronts Wd+ and Wd− of ± one order diffracted light directed to directions "D+1" and "D−1" (shown by broken lines whose intervals are narrower than those of the broken lines showing Wi in FIG. 3).

As described above, since regularly reflected light (zero order reflected light) can be obtained in the non-driven state in which no voltage is applied and diffracted light (one-order diffracted light) can be obtained in the driven state in which a voltage is applied, light can be modulated when these states are controlled for each pixel. That is, the phase reflection type diffraction grating can be obtained by controlling the depths of respective movable gratings, which correspond to respective pixels, in correspondence to an image signal.

When the phase reflection type diffraction grating such as the GLV device is used as the one-dimensional light modulating device, it is preferable to dispose a Schlieren aperture on a surface constituting the projection optical system 3 (reflection surface) to cut off diffracted light having a particular number of order of the diffracted light diffracted by the diffraction grating. When, for example, the Offner optical system is employed as the projection optical system 3, the Schlieren aperture can be disposed to a reflection surface on which light is reflected second, thereby a less expensive two-dimensional image forming apparatus can be realized by reducing the number of overall constituting parts.

Next, a countermeasure for field curvature, from which a problem arises when the light deflection means 4 has a large scanning angle, will be described. Note that the field curvature is caused when a two-dimensional image surface, which is formed when the scanning angle is large, is formed as a cylindrical surface having a center axis about a reflecting section formed linearly in the light deflection device (that is, this is a case in which light is deflected using a rotatable reflection means and, the reflecting sections correspond to a one-dimensional image).

In a lens composed of an ordinary coaxially symmetric spherical surface, a field flattener is known as a means for correcting regular field curvature, that is, as a means for correcting aberration by which an off-axis image surface is curved to the lens side. Exemplified as a typical example is a method of disposing a negative power lens in the vicinity of an image surface as shown in U.S. Pat. No. 2,076,190. In the present invention, since a surface to be corrected is not a spherical surface and it is the cylindrical surface, an optical device acting as the field flattener only in a direction to be corrected is necessary.

Thus, it is effective to interpose the optical device between the light deflection means 4 and the image surface of a two-dimensional image obtained by the light deflection means 4 as well as to use a surface in the optical device having curvature formed differently in the disposing direction in the one-dimensional display device 2 and in the direction perpendicular to the disposing direction (that corresponds to the scanning direction of the light deflection means). That is, the optical device is preferably formed in a shape regulated to have a surface including curvature which is different between a surface including a first direction, which is parallel to the disposing direction of the light emitting sections or the light modulating sections in the one-dimensional display device, and an optical axis direction and a surface including a second direction perpendicular to the first direction and the optical axis direction. For example, when the optical device is formed to have a flat surface (curvature: zero) on one side and to have a spherical surface on the other side, it is formed to have a cylindrical surface.

Although a problem arises when the two-dimensional image is formed only by the light deflection means, when the image surface is corrected using the optical device, an adverse effect is significantly caused because a light angle at which the two-dimensional image is formed is different between the direction in which the light emitting sections or the light modulating sections are disposed in the one-dimensional display device and the direction perpendicular to the above direction (that corresponds to the light scanning direction of the light deflection means).

That is, when the field curvature is corrected on the cylindrical surface (the cylindrical surface about the rotating axis of a reflection surface constituting the light deflection means), the light from the light deflection means angularly spreads outward (to a side apart from an optical axis in a light scanning direction as compared with the light in the disposing direction (direction along linear beams) in the one-dimensional display device. This is because the optical device has a function of the filed flattener (negative power) in the cylindrical surface because, in the cylindrical surface, the direction to be corrected by the optical device is limited only to the surface including the light scanning direction of the light deflection means as described above.

When a screen is disposed at a position of the two-dimensional image after it is corrected and the image is observed thereon, field angle characteristics have a non-symmetric property regardless of that the screen has a transmitting surface or a reflecting surface (excluding a case it has a perfect diffusion surface). Further, when a projection system is additionally provided to execute magnified projection using the two-dimensional image as an intermediate image, an incident pupil position of a lens system is different between the disposing direction in the one-dimensional display device and a direction perpendicular to the above direction, thereby a projection lens having a large aperture ratio is necessary to capture all the light beams. This results in an increase in size and cost of the projection lens.

When the two-dimensional image is corrected by a lens including a cylindrical surface (cylinder surface) before it is formed, a problem arises in that a lens arrangement is made complex. That is, since there is required an action contradicting to an optical action for correcting an image surface curved inward (to a side nearer to the light deflection means) to a flat surface as to the light scanning direction of the light deflection means, the lens has a complex arrangement in consideration of power distribution according to a light height.

Accordingly, the present invention solves the above problems by employing a linear Fresnel device (or a linear Fresnel lens) having a small optical path difference in a medium between the disposing direction in the one-dimensional display device and the light scanning direction of the light deflection means (direction perpendicular to the disposing direction in the one-dimensional display device). That is, an optical device having a Fresnel surface (or diffraction surface) is interposed between the light deflection means 4 and the image surface of a two-dimensional image obtained by the light deflection means 4 as well as the Fresnel surface is provided with power in the disposing direction in the one-dimensional display device or in the light scanning direction of the light deflection means (the Fresnel surface is not formed symmetric about an optical axis and has power only in a certain direction and has no power in a direction perpendicular to the above direction).
(Embodiments)

Respective embodiments according to the present invention will be described below.

Figure 4:
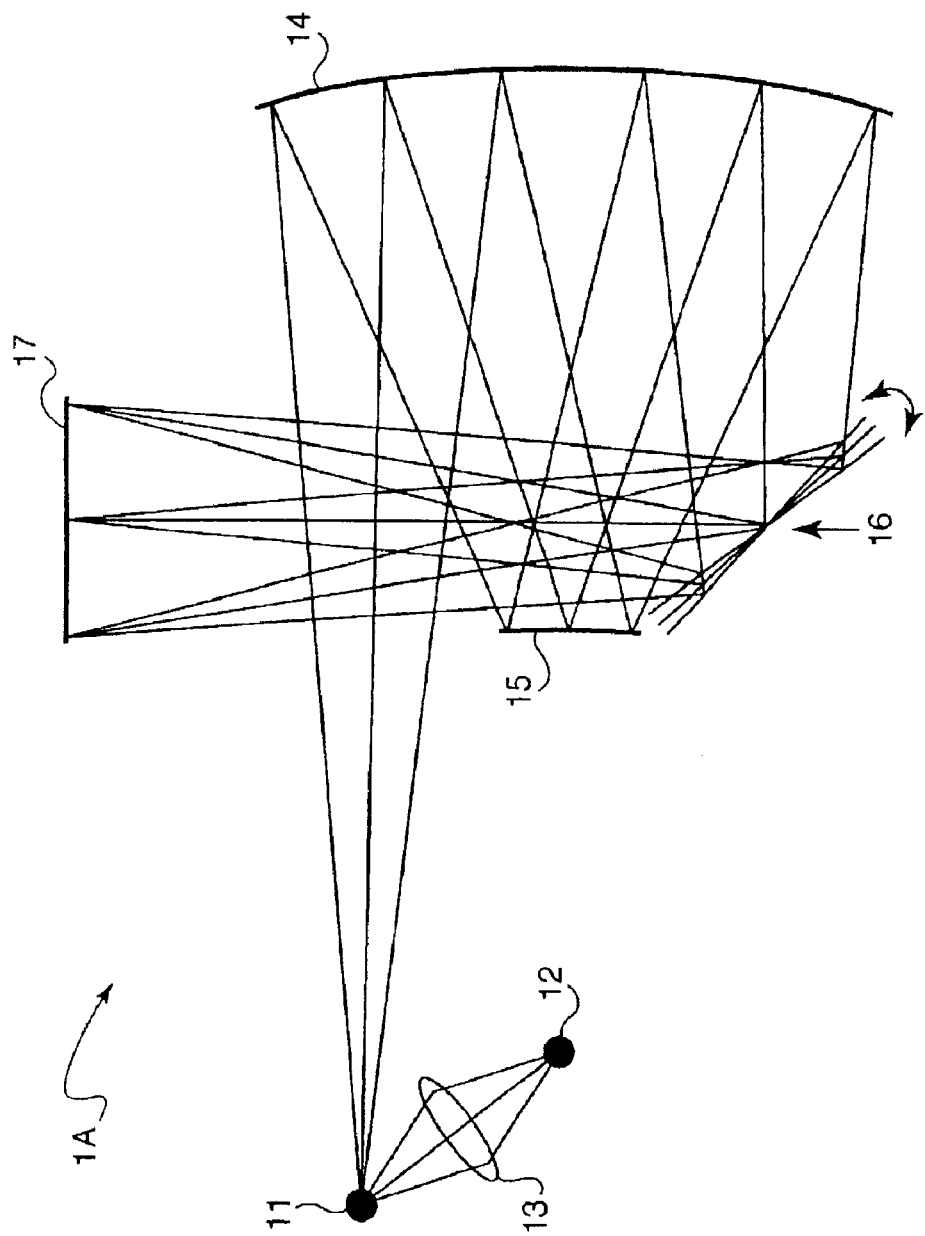
FIG. 4 is a view showing a first embodiment of the two-dimensional image forming apparatus together with FIG. 5 and shows an arrangement the apparatus on an X-Z plane.
Figure 5:
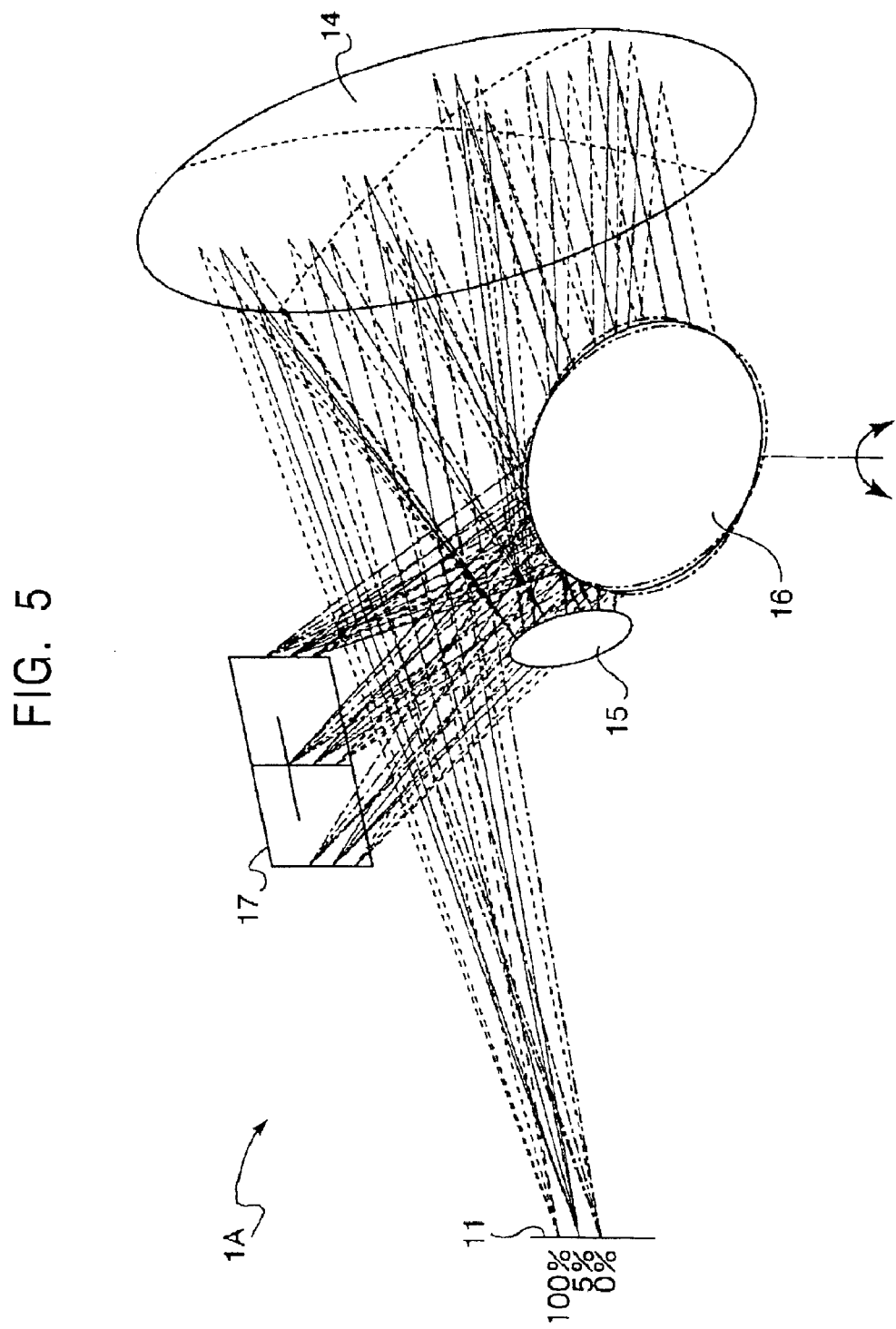
FIG. 5 is a perspective view showing an arrangement of a main portion of the two-dimensional image forming apparatus of the first embodiment.

FIGS. 4 and 5 schematically show an arrangement of a main portion of an optical system of a two-dimensional image forming apparatus 1A according to a first embodiment. In respective figures, respective X-, Y-, and Z-axes are locally set (for respective constituting elements), wherein the Z-axis shows an optical axis direction, and two axes perpendicular to the Z-axis are set as the X- and Y-axes. In FIG. 4, the X-axis is set on, for example, a sheet surface of the figure, and the Y-axis is arranged as an axis perpendicular to the sheet surface (therefore, FIG. 4 is a view showing an X-Z cross section). Further, FIG. 5 shows a part of the arrangement imaging apparatus a perspective view.

The two-dimensional image forming apparatus 1A includes a light source 12, a collective optical system 13, a one-dimensional display device 11, a primary mirror 14 and a secondary mirror 15 constituting an Offner optical system, and further a scanning mirror 16.

In this embodiment, the light source 12 (coherent light source or incoherent light source) is necessary because a one-dimensional light modulating device (GLV, that is, a reflection type liquid crystal device, and the like) is used as the one-dimensional display device 11.

The collective optical system 13 is provided to collect the light from the light source 12 and to irradiate it to the one-dimensional display device 11. Although the collective optical system 13 shown in the figure is simply composed a single element lens, it has an arrangement for irradiating linear beams in a direction along which light modulating sections are disposed in the one-dimensional display device 11.

In the one-dimensional display device 11, the disposing direction of the light modulating sections is regulated in a Y-axis direction. Right reflected (or diffracted) from the one-dimensional display device 11 is modulated by a control means (not shown) based on an image signal and is incident on the life-size projection Offner optical system (primary mirror 14 and secondary mirror 15). The Offner optical system corresponds to the projection optical system 3 described above and supplies light to the scanning mirror 16 after the light is reflected thereby three times.

The primary mirror 14 is in charge of first and third reflections of the light from the one-dimensional display device 11 and composed of a concave mirror facing in a direction approaching the one-dimensional display device 11. The secondary mirror 15 is in charge of a second reflection of the light and composed of a convex mirror facing in a direction approaching the primary mirror 14. The light, which is irradiated from the collective optical system 13 to the one-dimensional display device 11 and incident on the Offner optical system, is reflected first by the primary mirror 14 and reaches the secondary mirror 15, is reflected thereby second, and directed to the primary mirror 14 again. Then, the light reflected by the primary mirror 14 third is directed to the scanning mirror 16.

The flat scanning mirror 16 is provided to scan light on an X-Z plane (sheet surface in FIG. 4) perpendicular to the disposing direction (Y-axis direction) in the one-dimensional display device 11 by being driven by a not shown drive means (actuator and the like) and constitutes the light deflection means 4. That is, although the light outgoing from the Offner optical system to the scanning mirror 16 is light for forming a life-size image by the one-dimensional display device 11, the light is scanned before the image is formed thereby. When the one-dimensional display device 11 modulates the light based on an image signal according to a scanning angle of the scanning mirror 16, a two-dimensional image 17 can be formed by scanning a one-dimensional image in a direction perpendicular to a surface including the one-dimensional image.

FIG. 5 shows the one-dimensional display device 11, the primary mirror 14, the secondary mirror 15, and the scanning mirror 16 and further simply illustrates the one-dimensional display device 11 by a line segment extending in the disposing direction of the light modulating sections. Further, as to the light beams from the one-dimensional display device 11 to the surface of the two-dimensional image, only the light paths of main light beams, upper light beams, and lower light beams are shown when image heights are selected in term of percentages 0%, 50%, and 100%.

In this embodiment, when viewed from the Y-axis direction, light beams from the scanning mirror 16 to the two-dimensional image 17 are directed in a direction approximately perpendicular to the optical axis of the Offner optical system, thereby these light beams has such a positional relationship that they intersect the light beams incident on the primary mirror 14 from the one-dimensional display device 11 and the light beams reflected by the primary mirror 14 and the secondary mirror 15.

Figure 6:
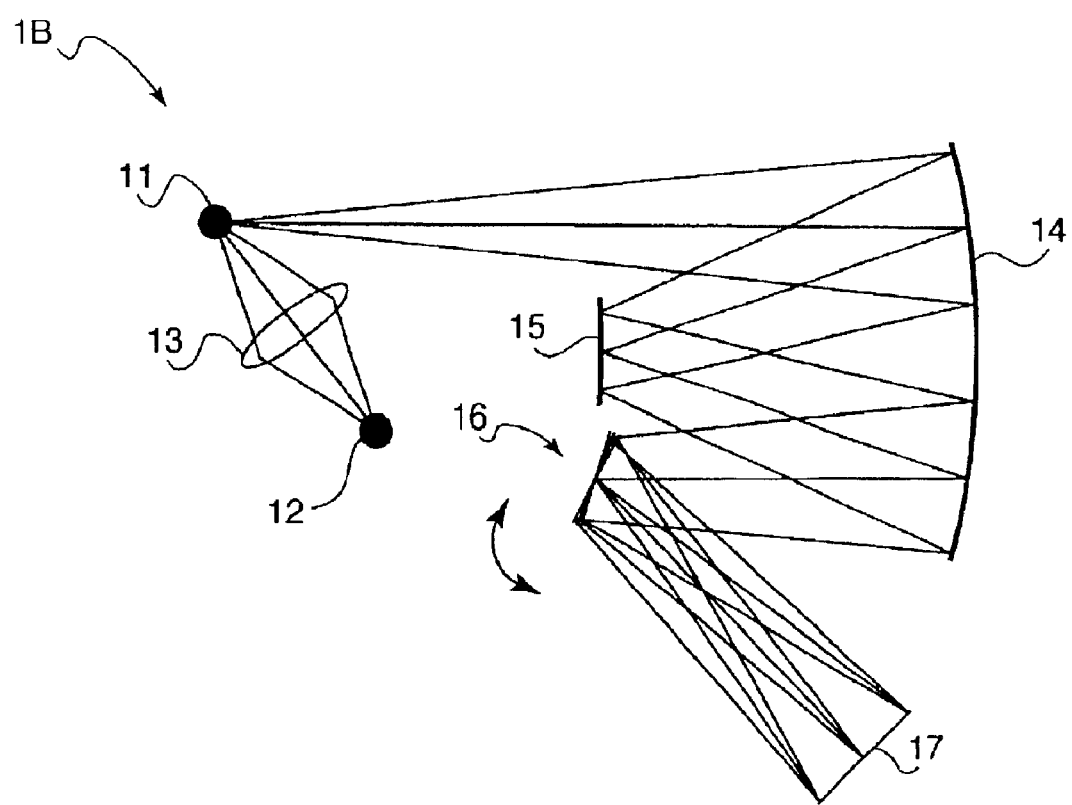
FIG. 6 is a view showing an arrangement of a second embodiment of the two-dimensional image forming apparatus according to the present invention on an X-Z plane.

FIG. 6 schematically shows an arrangement of a main portion of a two-dimensional image forming apparatus 1B according to a second embodiment on an X-Z cross section of an optical system. Note that, in respective figures, a manner for setting respective X-, Y, and Z-axes is the same as that of the first embodiment. Further, components having the same functions as those of the first embodiment are denoted by the same reference numerals as those of the first embodiments (which will be applied to the respective embodiments described below likewise).

In the embodiment, a position, where a two-dimensional image 17 is formed, is changed by setting the angle of a scanning mirror 16 to an angle different from that of the first embodiment 1A.

That is, the light paths of the light beams, which are irradiated from a light source 12 to a one-dimensional display device 11 through a collective optical system 13 and reach an Offner optical system, are the same as those of the image forming apparatus 1A described above. However, the direction in which the light beams outgo after they are reflected by the scanning mirror 16 is different from that of the image forming apparatus 1A. As shown in FIG. 6, after the light paths of the reflected light beams are changed by the scanning mirror 16, the reflected light beams are caused to outgo in a direction at an acute angle in a clockwise direction in FIG. 6 with respect to the center axis (rotating axis) of the scanning mirror 16.

When viewed from a Y-axis direction perpendicular to a sheet surface of FIG. 6, the light beams reflected by the scanning mirror 16 do not have such a positional relationship that they intersect the light beams incident on the primary mirror 14 from the one-dimensional display device 11, the light beams reflected by the primary mirror 14 first, and the light beams reflected by the secondary mirror 15. That is, the incident angle of the light beams, which are incident on the scanning mirror 16 from the Offner optical system, is reduced (that is, the incident angle is made shallow), and an optically effective region of the scanning mirror 16 (a region acting as a reflective surface) is also reduced. This is effective to reduce a load applied to a means for driving the scanning mirror 16 and to improve a reflectance of scanning mirror 16.

As described above, it is preferable to set the angle (or attitude) of the scanning mirror 16 such that an optical axis directed from the scanning mirror 16 to a two-dimensional image 17, when viewed from Y-axis direction, has an acute angle (less than 90°) with respect to the optical axis of the Offner optical system.

Figure 7:
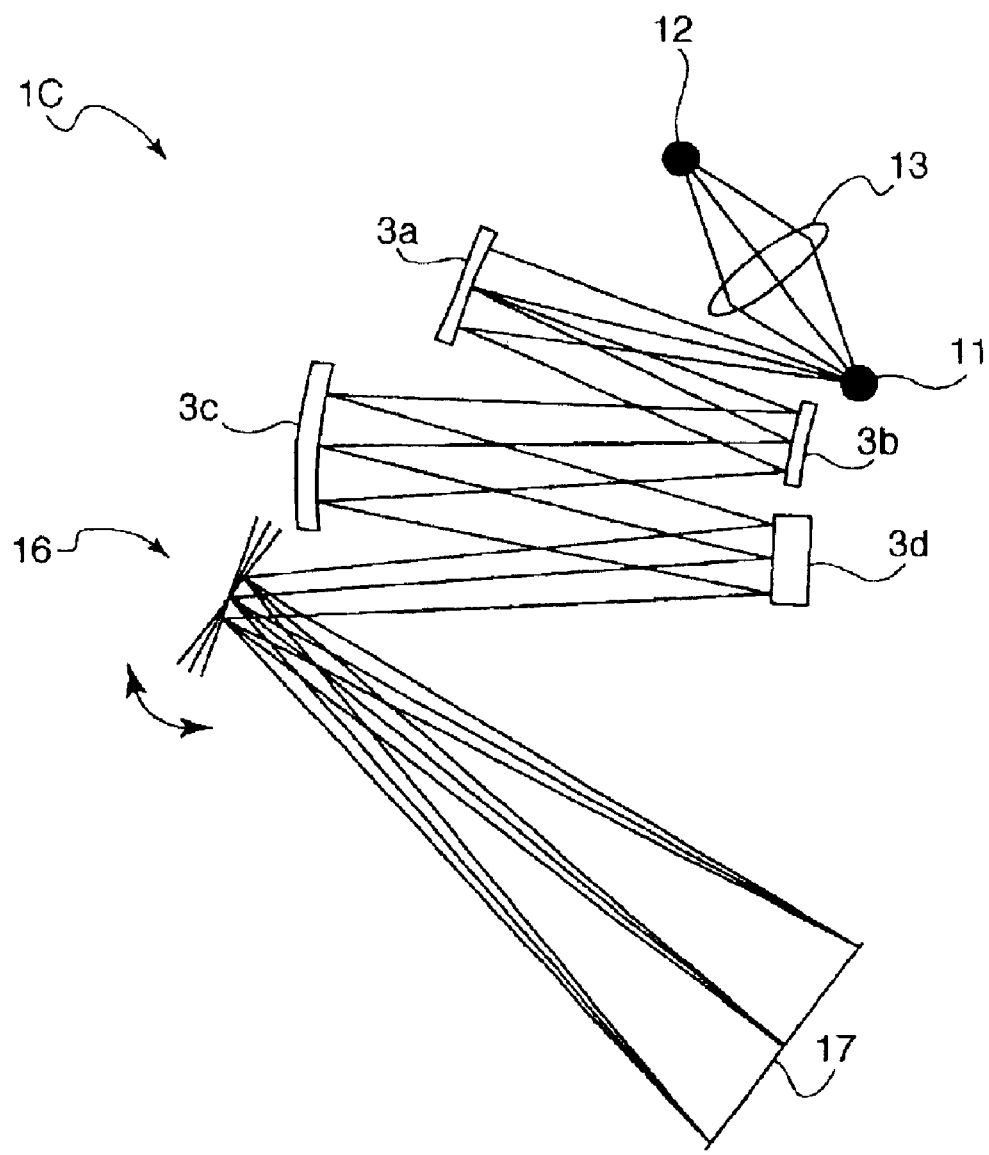
FIG. 7 is a view showing an arrangement of a third embodiment of the two-dimensional image forming apparatus according to the present invention on an X-Z plane.

FIG. 7 schematically shows an arrangement of a main portion of a two-dimensional image forming apparatus 1C according to a third embodiment on an X-Z cross section of an optical system.

In this embodiment, a two-dimensional image 17 is formed using a magnification projecting system, and a projection optical system is composed of four reflection devices 3a to 3d (that is, light beams are scanned after they are reflected four times).

The light beams, which are emitted from a light source 12 and irradiated to a one-dimensional display device 11 through a collective optical system 13, reach a scanning mirror 16 after they are reflected by the reflection devices 3a to 3d four times in this sequence. Then, a two-dimensional image 17 is obtained by scanning the light beams by the scanning mirror 16. At this time, however, when viewed from a Y-axis direction perpendicular to the sheet surface of the figure, an optical axis directed from the scanning mirror 16 to the two-dimensional image 17 has an acute angle with respect to an optical axis directed from the reflection device 3d to the scanning mirror 16.

Figure 8:
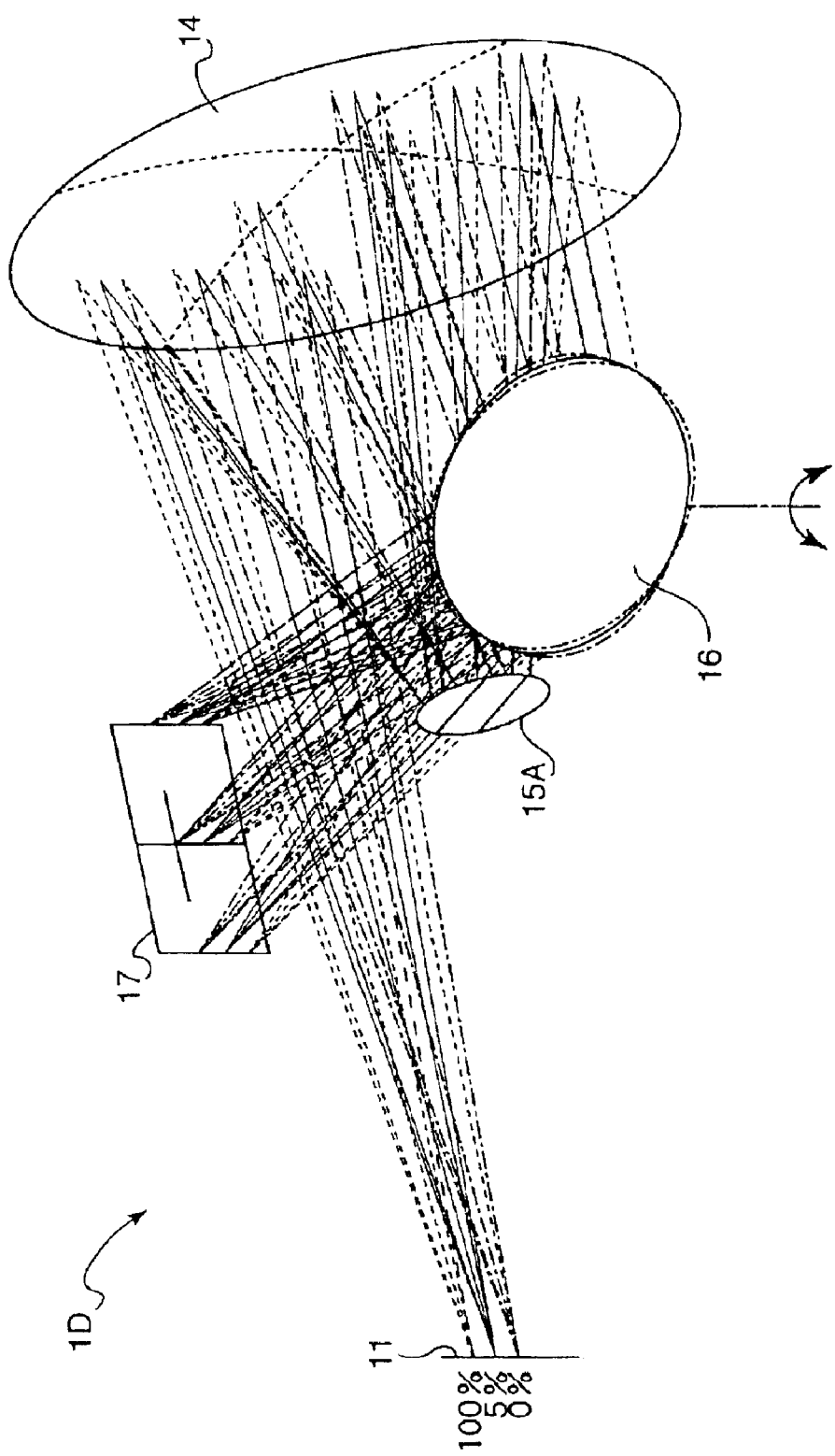
FIG. 8 is a perspective view showing a fourth embodiment of the two-dimensional image forming apparatus of the present invention together with FIG. 9 and shows an arrangement of a main portion of the aggregate photographing.

FIG. 8 is a perspective view showing an arrangement of a main portion of an optical system in a two-dimensional image forming apparatus ID according to a fourth embodiment.

In this embodiment, when a GLV device is used as a one-dimensional display device 11, a Schlieren aperture is disposed to a secondary mirror 15A of an Offner optical system. That is, although a basic arrangement of the optical system is the same as that of the image forming apparatus 1A shown in the first embodiment, the secondary mirror 15A has a different surface arrangement.

Note that, in this embodiment, since the one-dimension light modulating device (GLV device and the like) is used as the one-dimensional display device 11, a not shown light source is necessary, and a laser (semiconductor laser and the like) is used as a coherent light source.

Figure 9:
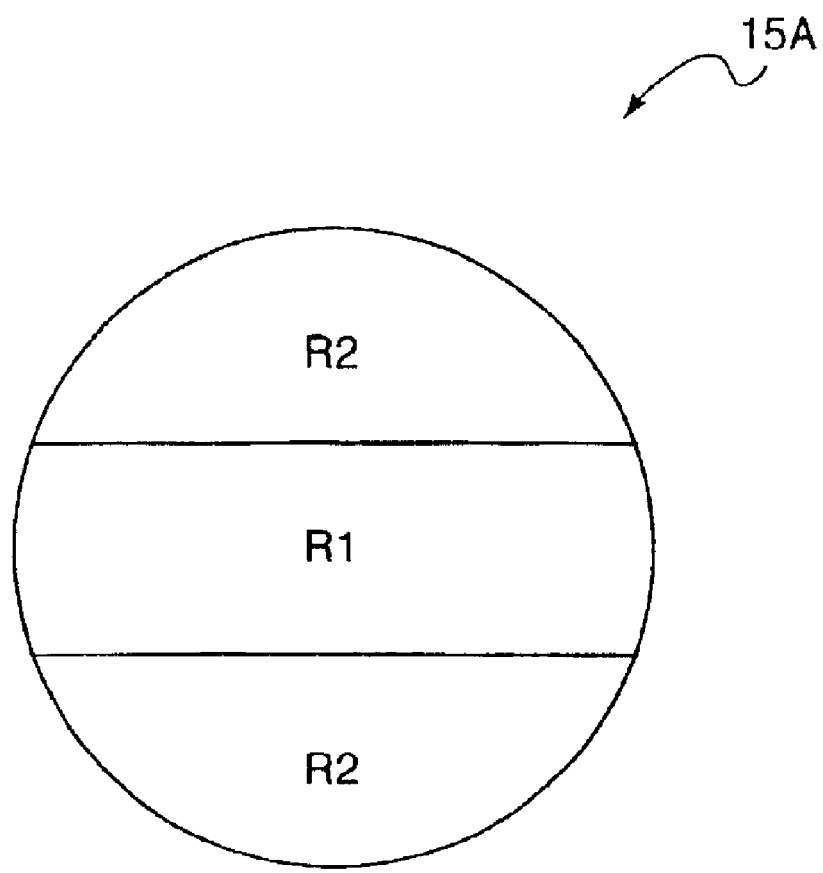
FIG. 9 is a view explaining a Schlieren aperture.

FIG. 9 schematically shows partitioning of a region of the secondary mirror 15A.

The region is partitioned by two line segments to a sub-region R1 and sub-regions R2, R2 disposed on and under the sub-region R1. When for example, the zero-order diffracted lights from the GLV device acting as the one-dimensional display device 11 are used as ON light beams (which correspond to white in monochrome) and the ± one-order light beams therefrom are used as OFF light beams (shielded light beams corresponding to black), it is preferable, in the secondary mirror 15A, to use only the sub-region R1, which is separable according to a diffraction angle, as a reflection surface and to use the sub-regions R2, R2 as shield regions. That is, the zero order light beams irradiated to the sub-region RI are reflected and the ± one-order light beams irradiated to the sub-regions R2, R2 are shielded. Contrary to the above, when the ± one-order reflected light beams from the GLV device acting as the one-dimensional display device 11 are used as the ON light beams and the zero order light beams therefrom are used as the OFF light beams, the sub-regions R2, R2 in the secondary mirror 15A are used as reflection surfaces and the sub-region R1 is used as a shield region.

As described above, it is sufficient to regulate the sub-region R1 and the sub-regions R2, R2 such that any one of them acts as the reflection surface depending on whether any one of the direct light beams (zero-order light beams) and the diffracted light beams (± one order light beams) are defined as the ON light beams or as the OFF light beams. With this arrangement, since the secondary mirror 15A is provided with the function of the Schlieren aperture, thereby the arrangement of the image forming apparatus 1D can be simplified (additional members such as a Schlieren filter and the like are not necessary).

Figure 10:
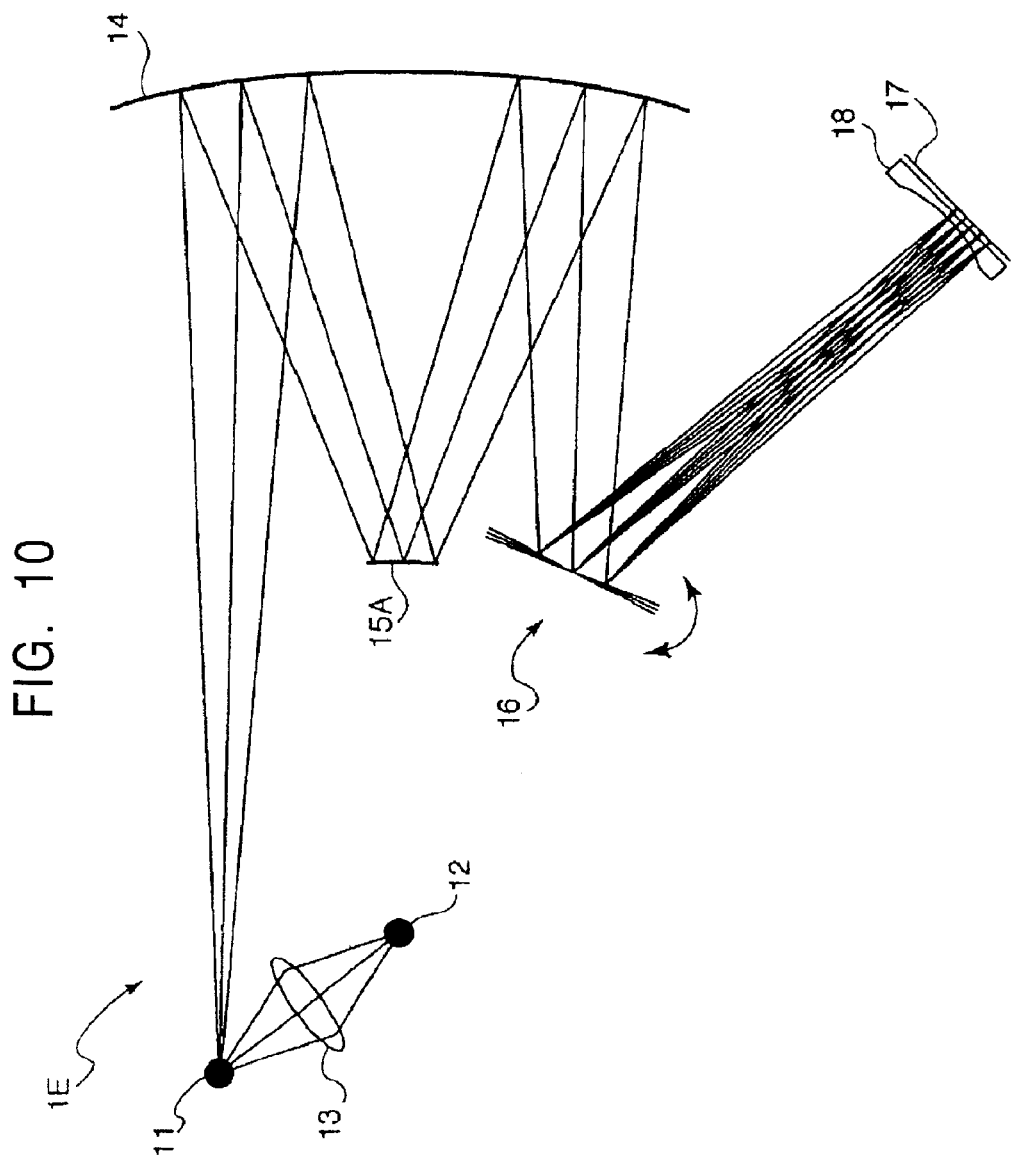
FIG. 10 is a view showing an arrangement of a fifth embodiment of the two-dimensional image forming apparatus according to the present invention on an X-Z plane.

FIG. 10 schematically shows an arrangement of a two-dimensional image forming apparatus 1E according to a fifth embodiment on an X-Z cross section of an optical system.

Although the optical system is basically arranged similarly to that of the second embodiment 1B described above, it is different therefrom in that an image surface correcting optical device 18 is disposed behind a scanning mirror 16.

In this embodiment, the optical device 18 is composed of a single lens. One of the surfaces of the lens (surface on a scanning mirror 16 side) is formed in a cylindrical surface which is formed in a concave surface in an X-Z plane and in a flat surface in a Y-Z plane. Further, the other surface of the lens (surface on a two-dimensional image 17 side) is formed in a center symmetric aspheric surface. A one-dimensional display device 11 executes reading with an F number 8, and light beams are incident on the scanning mirror 16 at an angle set to ±2.6° about a reference angle 22°. Further, the one-dimensional display device 11 has a length in a Y-axis direction set to 14 (in an arbitrary unit), and the two-dimensional image 17 is formed in a square shape having a size set to 14×14 (in an arbitrary unit). The specifications of the optical device 18 will be specifically shown in Table 1.

shows a twelfth order coefficient. Further, "Q" shows a coefficient of a second order additive constant term. In this embodiment, fourth to tenth terms are employed, and Q=H= 0. In Table 1, an exponential expression "E-x" shows $10^{"-x"}$.

Note that the polarity of the surface separation in Table 1 is reversed by reflection. In the columns showing the action of the surface, "RELF" shows a reflection surface, and the columns without notation show a transmission surface. In the columns of material, "PMMA" shows acrylic resin.

Symbols "XDE", "YDE", "ZDE" shown in columns of reference show displacement amounts (shift amounts) in respective X-, Y-, and Z-axis directions from the optical axes

TABLE 1

| Surface No., etc | Radius of curvature (RDY) | Surface separation | Action of surface | Material | Reference |
|---|---|---|---|---|---|
| OBJ | ∞ | 300.000000 | | | |
| 1 | −300.000000 | −147.594322 | REFL | | |
| S | −150.000000 | 147.594322 | REFL | | |
| 3 | −300.000000 | −150.000000 | REFL | | |
| 4 | ∞ | 152.853599 | REFL | | XDE: −50.000000 |
| | | | | | YDE: 0.000000 |
| | | | | | ZDE: 0.000000 |
| | | | | | ADE: 0.000000 |
| | | | | | BDE : 22.000000 |
| | | | | | CDE: 0.000000 |
| 5 | ∞ CYL RDX: −57.24514 | 2.000000 | | PMMA | |
| 6 | 465.49785 | 0.414599 | | | ASP |
| | | | | | K: −101.129724 |
| | | | | | D: 0.893498E−06 |
| | | | | | E: −0.202882E−07 |
| | | | | | F: 0.314679E−10 |
| | | | | | G: 0.181930E−13 |
| IMG | ∞ | | | | |

Note that, in Table 1 and Tables shown below, coordinate systems are set locally (they shift depending on, for example, reflection). Further, surface numbers and the like are provided to specify constituting surfaces, wherein "OBJ" shows an object point, that is, the one-dimensional display device 11, "S" shows an aperture, and "IMG" shows an image surface (two-dimensional image surface). The radius of curvature (RDY) of, for example, the optical device 18 is shown as "CYL" because the surface of it on the scanning mirror side (surface No. 5) is formed in a cylindrical surface on the X-Z plane although it is infinite in the Y-Z plane as described above as well as the raids of curvature thereof is shown as "RDX" on the X-Z plane.

The surface of the optical device 18 on the two-dimensional image side (surface No. 6) is shown as "ASP" which shows an aspheric surface.

The aspheric surface is shown by, for example, the following expression.

$$z = \frac{C \cdot h^2}{1 + \sqrt{1 - (K+1) \cdot C^2 \cdot h^2}} + Q \cdot h^2 + D \cdot h^4 + E \cdot h^6 + F \cdot h^8 + G \cdot h^{10} + H \cdot h^{12} \quad (1)$$

In the above expression, "z" shows a sag amount from an X-Y plane including a surface apex, and "h" shows the distance from an optical axis in the X-Y plane including the surface apex. Further, "C" shows curvature (the reciprocal number of a radius of curvature), "K" shows a cone constant, respectively. As to aspheric coefficients "D", "E", "F", "G", "H", "D" shows a fourth order coefficient (constant), "E" shows a sixth order coefficient, "F" shows an eighth order coefficient, "G" shows a tenth order coefficient, and "H"

of the primary mirror 14 and the secondary mirror 15, respectively. That is, since XDE of the scanning mirror 16 having a surface No. 4 is set to "−50" (in an arbitrary unit), the scanning mirror 16 has a center of rotation located at a position displaced 50 in a minus direction of an X-axis with respect to the optical axes of the primary mirror 14 and the secondary mirror 15. Further, symbols "ADE", "BDE", "CDE" show rotational angles (degree)s about the respective X-, Y-, and Z-axes. In this embodiment, the scanning mirror 16 is rotated about the Y-axis in an angular attitude of 22° within the predetermined angle range (±2.6°) as described above.

Figure 11:
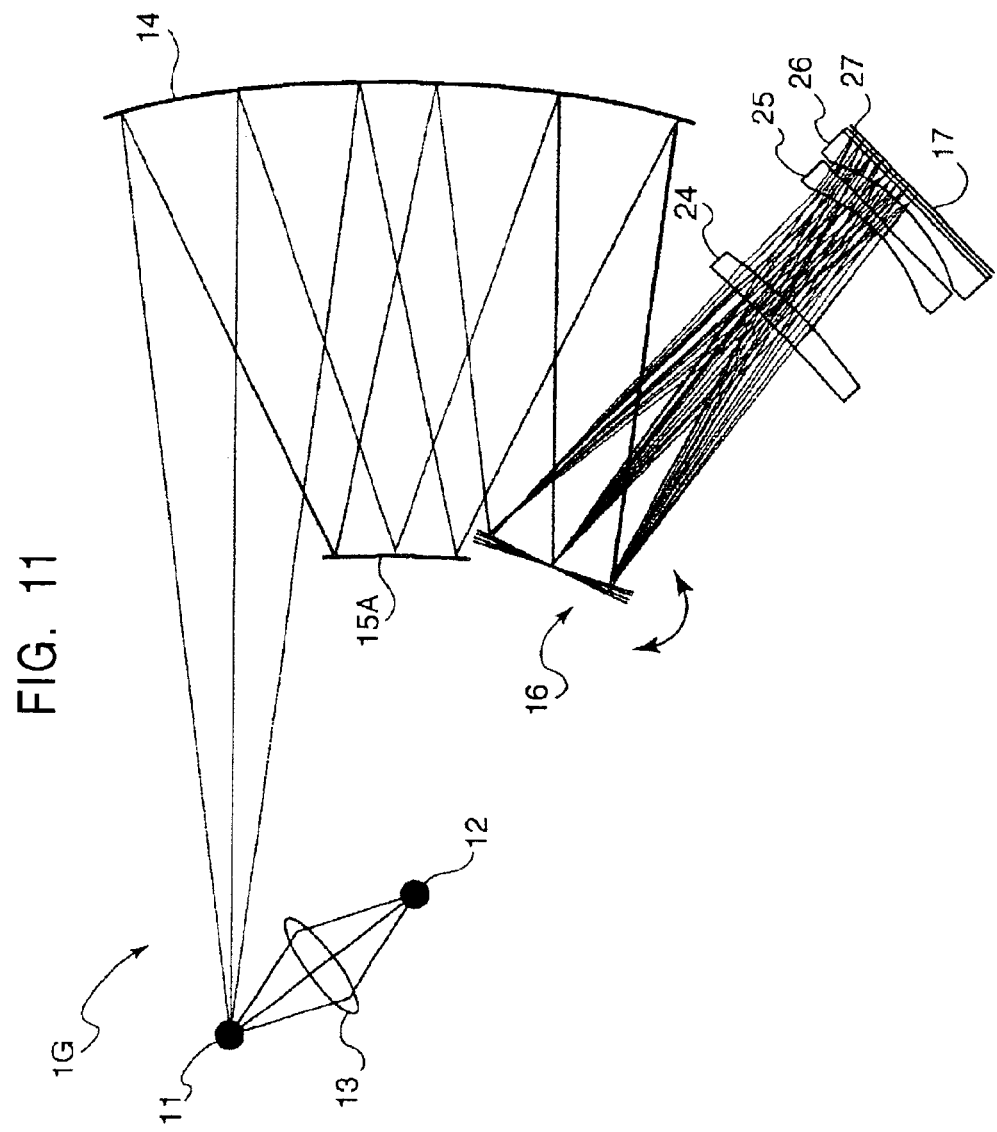
FIG. 11 is a view showing an arrangement of a sixth embodiment of the two-dimensional image forming apparatus according to the present invention on an X-Z plane.

FIG. 11 schematically shows an arrangement of a two-dimensional image forming apparatus 1F according to a sixth embodiment on an X-Z cross section of an optical system.

As to a basic arrangement of the optical system, the sixth embodiment 1F is different from the above fifth embodiment 1E in that a scanning angle of a scanning mirror 16 is relatively large and that an optical device composed of a plurality of lenses are used to correct an image surface.

Curvature of field of a two-dimensional image 17 in an X-axis direction due to the scanning mirror 16 is corrected by four image surface correction lenses 19 to 22. Almost all the surface of the respective lenses are formed as cylindrical surfaces and formed flat on a Y-Z plane.

As shown in FIG. 11, the lenses have such shapes on an X-Z plane that the lens 19 is formed in a meniscus shape with both the sides thereof concaved on the scanning mirror 16 side, and the next lens 20 is formed in a biconvex shape near to a plano-convex shape (convex cylindrical lens). The next lens 21 is formed in a biconcave shape (concave cylindrical lens), and the lens 22 located behind the lens 21 is formed in a plano-concave shape. Note that a parallel sheet 23 disposed just behind the lens 22 is a cover glass.

In the sixth embodiment, a one-dimensional display device 11 executes reading with an F number 5, and light beams incident on the scanning mirror 16 is set to ±4.5° about a reference angle 22°. Further, the one-dimensional display device 11 has a length set to 14 (in an arbitrary unit) in a Y-axis direction, and the two-dimensional image 17 is formed in a rectangular shape having a size set to 14×24.9 (in an arbitrary unit). The specifications of the optical device 18 will be specifically shown in Table 2.

as a result of image surface correction executed by the respective lenses, the light angle of light beams for forming a two-dimensional image 17 has a telecentric property in a Y-axis direction along a disposing direction in a one-dimensional display device 11, whereas the image is formed by light beams apart from an optical axis in an X-axis direction perpendicular to the Y-axis direction. Accordingly, a distribution of light angles is aligned by setting a pupil position to infinity in the X-axis direction using the linear Frensnel device 27.

Any of the lenses 24 to 26 is composed of a cylindrical lens and corrects field curvature (cylindrical curvature). However, since the surface of the linear Frensnel device 27 on the two-dimensional image 17 side is arranged as a linear Frensnel surface and has a lens action, it corrects the light angle in a direction where the curvature is corrected, that is, in an X-Z plane. That is, the Fresnel surface of the linear Frensnel device 27 has such a shape that it has power in a

TABLE 2

| Surface No., etc | Radius of curvature (RDY) | Surface separation | Action of surface | Material | Reference |
|---|---|---|---|---|---|
| OBJ | ∞ | 300.000000 | | | |
| 1 | −300.000000 | −147.594322 | REFL | | |
| S | −150.000000 | 147.594322 | REFL | | |
| 3 | −300.000000 | −150.000000 | REFL | | |
| 4 | ∞ | 0.000000 | REFL | | XDE: −50.000000<br>YDE: 0.000000<br>ZDE: 0.000000<br>ADE: 0.000000<br>BDE: 22.000000<br>CDE: 0.000000 |
| 5 | ∞ | 117.976596 | | | |
| 6 | ∞<br>CYL<br>RDX: −48.27542 | 5.000000 | | BSC7_<br>HOYA | |
| 7 | ∞<br>CYL<br>RDX: −48.42081 | 0.000000 | | | |
| 8 | ∞<br>CYL<br>RDX: 3979.57861 | 5.000000 | | BSC7_<br>HOYA | |
| 9 | ∞<br>CYL<br>RDX: −124.07794 | 15.00000 | | | |
| 10 | ∞<br>CYL<br>RDX: −67.98466 | 5.000000 | | BSC7_<br>HOYA | |
| 11 | ∞<br>CYL<br>RDX: 220.71565 | 7.881522 | | | |
| 12 | ∞<br>CYL<br>RDX: −66.81892 | 2.000000 | | BSC7_<br>HOYA | |
| 13 | ∞ | 2.000000 | | BSC7_<br>HOYA | |
| 14 | ∞ | 1.24315 | | | |
| IMG | ∞ | | | | |

Note that a reflection surface (surface No. 4) of the scanning mirror 16 has a center of rotation located at a position displaced 50 in an arbitrary unit in an X-axis direction with respect to the optical axes of a primary mirror 14 and a secondary mirror 15, similarly to the above fifth embodiment 1E.

Figure 12:
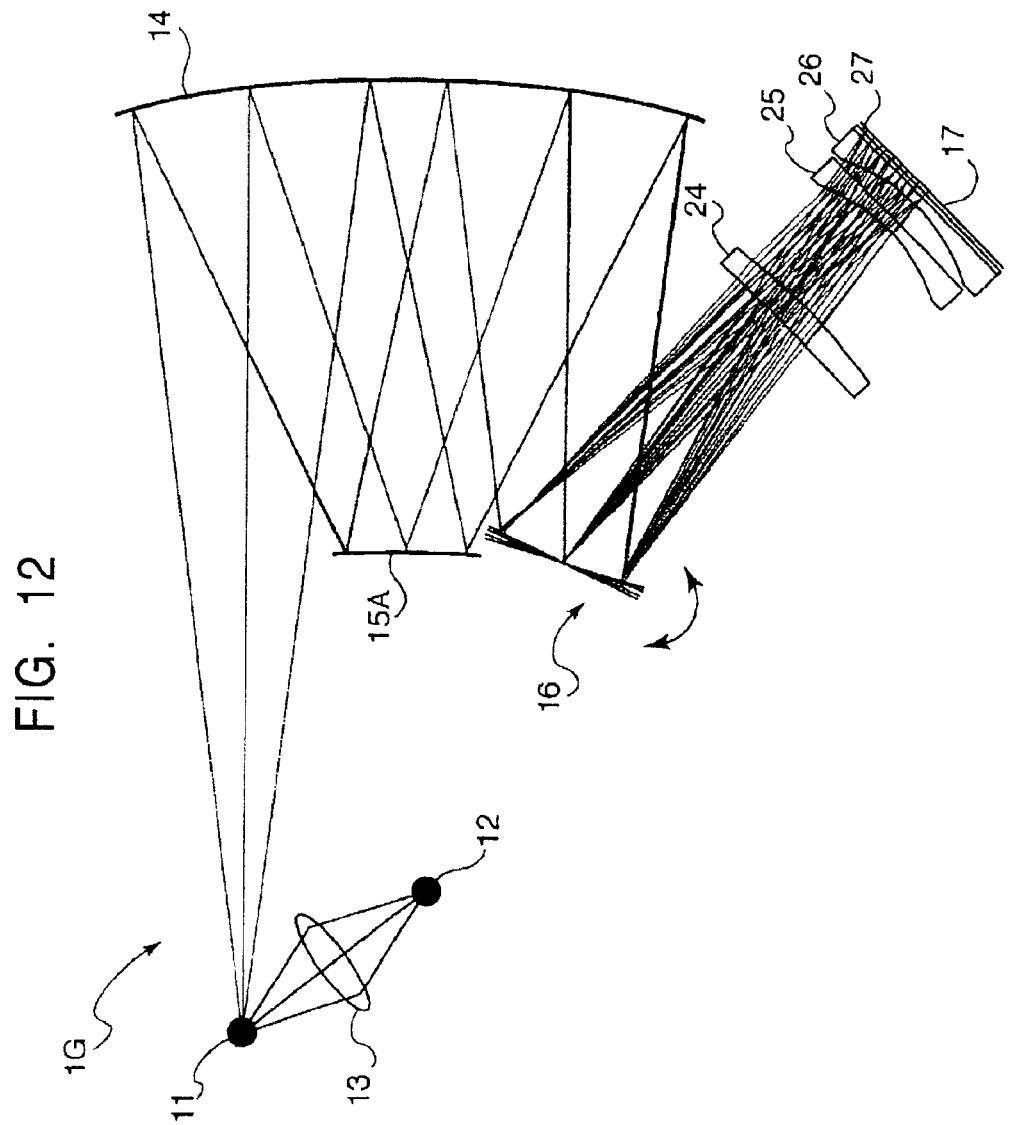
FIG. 12 is a view showing an arrangement of a seventh embodiment according to the present invention on an X-Z plane.

FIG. 12 schematically shows an arrangement of a two-dimensional image forming apparatus 1G according to a seventh embodiment on an X-Z cross section of an optical system.

Figure 13:
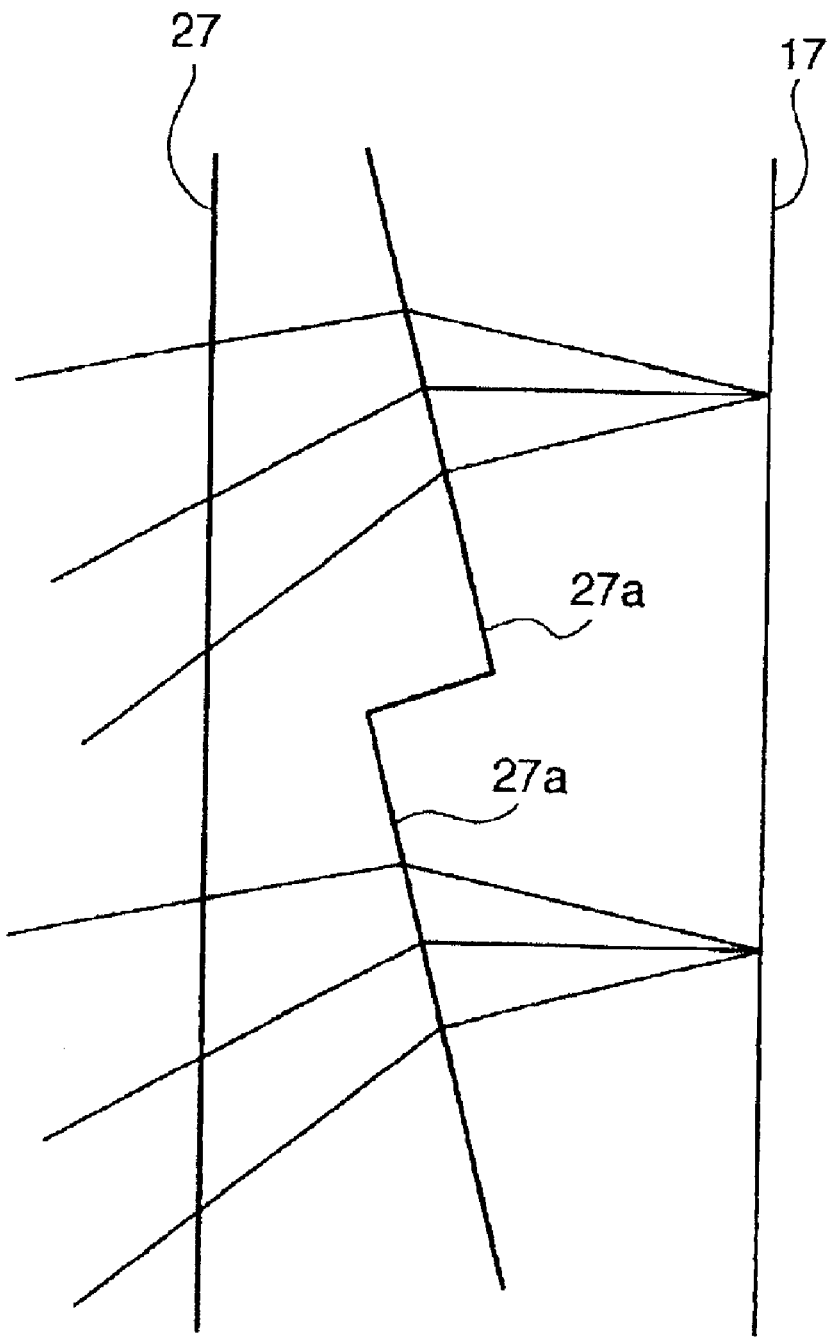
FIG. 13 is a view explaining a linear Fresnel device.

In this embodiment, the optical system is composed of three image surface correction lenses 24 to 26 and a linear Frensnel device 27 (refer to FIG. 13). That is, as a result of scanning executed by a light deflection device, and further surface including the X-axis direction perpendicular to the disposing direction in the one-dimensional display device 11 and a Z-axis direction (optical axis direction). This is because the linear Frensnel device 27 is necessary to set the light beams outgoing outward (direction departing from the light axis) in a telecentric condition with respect to a two-dimensional image surface in correspondence to that the image surface correction lens group acts as a field flattener on the X-Z plane. That is, when the correction lens group has no power on a Y-Z plane, the telecentric condition is established in the Y-Z plane, so that the linear Frensnel device must have power in the X-Z plane to align the pupil position.

FIG. 13 is an enlarged view of a main portion showing portions (27a) of the linear Frensnel surface.

FIG. 13 shows a manner by which outgoing light beams are corrected so that the telecentric condition is obtained on an image side.

In the seventh embodiment, the one-dimensional display device 11 executes reading with an F number 4, and light beams incident on a scanning mirror 16 is set to ±4.5° about a reference angle 22°. Further, the one-dimensional display device 11 has a length set to 14 (in an arbitrary unit) in a Y-axis direction, and the two-dimensional image 17 is formed in a rectangular shape having a size set to 14×24.9 (in an arbitrary unit). The specifications of the linear Fresnel device 27 will be specifically shown in Table 3.

TABLE 3

| Surface No., etc | Radius of curvature (RDY) | Surface separation | Action of surface | Material | Reference |
|---|---|---|---|---|---|
| OBJ | ∞ | 300.000000 | | | |
| 1 | −300.000000 | −147.908917 | REFL | | |
| S | −150.000000 | 147.908917 | REFL | | |
| 3 | −300.000000 | −150.000000 | REFL | | |
| 4 | ∞ | 0.000000 | REFL | | XDE: −50.000000 |
| | | | | | YDE: 0.000000 |
| | | | | | ZDE: 0.000000 |
| | | | | | ADE: 0.000000 |
| | | | | | BDE: 22.000000 |
| | | | | | CDE: 0.000000 |
| 5 | ∞ | 98.650000 | | | |
| 6 | ∞ CYL RDX: −271.04100 | 8.000000 | | BSC7_ HOYA | |
| 7 | ∞ CYL RDX: −186.00000 | 34.310000 | | | |
| 8 | ∞ CYL RDX: 109.37000 | 5.000000 | | BSC7_ HOYA | |
| 9 | ∞ | 7.950000 | | | |
| 10 | ∞ CYL RDX: −70.01000 | 3.500000 | | BSC7_ HOYA | |
| 11 | ∞ | 1.000000 | | PMMA | |
| 12 | ∞ LINEAR FRESNEL RDX: −27.80837 | 1.600000 | | | SAG DEPTH0.1 ASP K: −5.1035E−01 D: 2.2897E−06 E: 1.3747E−09 |
| IMG | ∞ | | | | |

Note that "LINEAR FRESNEL" in surface No. 12 shows that a linear Fresnel surface is formed, "SAG DEPTH" in a reference column shows a Fresnel groove depth (sag amount) that is 0.1 (in an arbitrary unit) in this embodiment, and Fresnel grooves are formed linearly (or stepwise) in the Y-axis direction. The linear Fresnel surface has a basic surface shape shown by an aspheric expression, and, in this embodiment, high order terms are set to fourth and sixth order terms (that is, this corresponds to a case in which "F=G=Q=H=0 in the above expression (1)).

The scanning mirror 16 having surface No. 4 has a center of rotation at a position displaced 50 (in an arbitrary unit) in an X-axis direction with respect to the optical axis of a secondary mirror 15, similarly to the above embodiment.

The present invention is not limited to this embodiment, and the Fresnel surface of the linear Fresnel device may be formed to have power only on a surface including the Y-axis direction parallel to the disposing direction in the one-dimensional display device and a Z-axis direction. That is, it is of course possible to align the distribution of light angles by leaving light beams outgoing outward as they are and aligning the pupil position by a linear Fresnel device having power on a Y-Z surface in correspondence to that the image surface correction lens group acts as a field flattener on the X-Z plane.

FIG. 14 schematically shows an example of an arrangement of a two-dimensional image forming apparatus having an on an X-Z cross section of an optical system.

In this example, the image forming apparatus from a light source 12 to a two-dimensional image 17 is arranged approximately similarly to the light scanning device 1G according to the seventh embodiment and projects a two-dimensional image 17 acting as an intermediate image in a magnified form by additionally using a projection lens system 28 (corresponding to the magnification projecting system 5 described above). That is, after the field curvature is corrected by the cylindrical lens group composed of the three lenses (24 to 26), the linear Frensnel device 27 executes correction for causing light directions to be in agreement with each other (that is, for causing them to be agreement with each other in infinity) in the disposing direction in the one-dimensional display device 11 (Y-axis direction) and in the X-axis direction perpendicular to the Y-axis direction (corresponding to a light scanning direction) as to the pupil position of the projection lens system 28 on the intermediate image side. Thus, it is sufficient for the projection lens system 28 to have a function for simply magnifying the two-dimensional image 17. For example, it is possible to follow in the specification of a projection lens system designed to a two-dimensional display panel (display device) used in, for example, a liquid crystal type projector and the like and to apply it as it is.

Note that an incident angle to the scanning mirror 16 is ±4.5° about a reference angle of 22° similarly to the seventh embodiment 1G dad above. Further, the one-dimensional display device 11 has a length set to 14 (in an arbitrary unit) in the Y-axis direction, and the two-dimensional image 17 is formed in a rectangular shape having a size set to 14×24.9 (in an arbitrary unit).

The specifications of the optical system including the projection lens system 28 will be shown in Tables 4 to 6.

TABLE 4

| Surface No., etc | Radius of curvature (RDY) | Surface separation | Action of surface | Material | Reference |
|---|---|---|---|---|---|
| OBJ | ∞ | 300.000000 | | | |
| 1 | −300.000000 | −147.757966 | REFL | | |
| S | −150.000000 | 147.757966 | REFL | | |
| 3 | −300.000000 | −150.000000 | REFL | | |
| 4 | ∞ | 0.000000 | REFL | | XDE: −50.000000 |
| | | | | | YDE: 0.000000 |
| | | | | | ZDE: 0.000000 |
| | | | | | ADE: 0.000000 |
| | | | | | BDE: 22.000000 |
| | | | | | CDE: 0.000000 |
| 5 | ∞ | 98.650000 | | | |
| 6 | ∞ CYL RDX: −271.04100 | 8.000000 | | BSC7_HOYA | |
| 7 | ∞ CYL RDX:−186.00000 | 34.310000 | | | |
| 8 | ∞ CYL RDX: 109.37000 | 5.000000 | | BSC7_HOYA | |
| 9 | ∞ | 7.950000 | | | |
| 10 | ∞ CYL RDX: −70.01000 | 3.500000 | | BSC7_HOYA | |
| 11 | ∞ | 1.000000 | | N = 1.458570 ν = 67.6 | |
| 12 | −23.00000 LINEAR FRESNEL RDX: −23.00000 | 1.000000 | | | SAG DEPTH0.8 ASP K: −1.0000E+00 D: 0.0000E+00 E: 0.0000E+00 F: −1.4089E−13 G: −1.1595E−15 H: −1.5377E−18 Q: 9.7608E−04 |
| 13 | ∞ | 1.600000 | | | |
| 14 | ∞ | 13.170900 | | | |

TABLE 5

| Surface No., etc | Radius of curvature (RDY) | Surface separation | Action of surface | Material |
|---|---|---|---|---|
| 15 | ∞ | 1.500000 | | BSC7_HOYA |
| 16 | ∞ | 6.810854 | | |
| 17 | −239.04806 | 7.648253 | | LAC14_HOYA |
| 18 | −74.96587 | 4.451043 | | |
| 19 | 132.80490 | 9.633872 | | LAC14_HOYA |
| 20 | −142.72327 | 0.300000 | | |
| 21 | 119.86730 | 5.603176 | | BSC7_HOYA |
| 22 | 40.68341 | 6.461802 | | |
| 23 | 153.44574 | 14.988582 | | FCD1_HOYA |
| 24 | −33.52537 | 2.500000 | | EADF10_HOYA |
| 25 | 41.03830 | 0.344171 | | |
| 26 | 39.58057 | 17.118257 | | FCD1_HOYA |
| 27 | −36.65757 | 2.500000 | | EADF10_HOYA |
| 28 | −146.57670 | 0.300000 | | |
| 29 | 121.32599 | 2.500000 | | EADF10_HOYA |
| 30 | 32.02774 | 10.727834 | | FCD1_HOYA |
| 31 | −321.17274 | 8.855674 | | |
| 32 | 79.66711 | 4.378399 | | FCD1_HOYA |
| 33 | 437.28359 | 10.201834 | | |
| 34 | ∞ | 8.698093 | | |
| 35 | 464.97388 | 4.267202 | | TAF3_HOYA |
| 36 | −159.35348 | 2.554303 | | |
| 37 | 210.55156 | 4.747936 | | TAF3_HOYA |
| 38 | −223.02181 | 2.000000 | | |
| 39 | ∞ | 26.000000 | | BSC7_HOYA |
| 40 | ∞ | 26.000000 | | BSC7_HOYA |

TABLE 6

| Surface No., etc | Radius of curvature (RDY) | Surface separation | Action of surface | Material | Reference |
|---|---|---|---|---|---|
| 41 | ∞ | 10.345190 | | | |
| 42 | −49.01155 | 2.791513 | | BACD16_HOYA | |
| 43 | −92.29560 | 15.185607 | | | |

TABLE 6-continued

| Surface No., etc | Radius of curvature (RDY) | Surface separation | Action of surface | Material | Reference |
|---|---|---|---|---|---|
| 44 | −44.39702 | 5.006000 | | N = 1.491540 $\nu$ = 57.8 | ASP K: 0.686338 D: −0.152117E−04 E: 0.350396E−08 |
| 45 | −59.38627 | 4.165091 | | | |
| 46 | −38.66182 | 5.506600 | | N = 1.491540 $\nu$ = 57.8 | ASP K: −4.236059 D: −0.837946E−06 E: 0.484762E−09 F: −0.167842E−11 G: 0.441023E−15 |
| 47 | −185.74899 | 3.575166 | | | ASP K: 4.4776 D: −0.644592E−05 E: 0.304791E−08 F: −0.114285E−11 |
| 48 | −53.57842 | 11.424834 | | BACD16 HOYA | |
| 49 | −148.51702 | 3719.512826 | | | |
| IMG | ∞ | 0.000000 | | | |

Note that, "N" shown in the columns of material of surface No. 11 in Table 4 and surface Nos. 44 and 46 in Table 6 shows an index of refraction and "$\nu$" in these columns shows an Abbe number. Further, the projection lens system 28 has such specifications that an image can be projected onto a screen about 3720 mm apart from the position of an apex of a lens (front lens) located at a final stage. A final surface "IMG" in Table 6 corresponds to a screen surface (does not correspond to an intermediate image surface).

As apparent from the above description, according to aspects of the present invention, a two-dimensional image is formed by optically scanning a one-dimensional image before it is projected in a magnified form in place of that the one-dimensional image is optically scanned after the image acting as an intermediate image is projected in the magnified form by the projection lens. Therefore, it is possible to miniaturize the image forming apparatus including the magnification projecting system, to simplify the arrangement of the apparatus, and to decrease the cost thereof. Further, since it is possible to magnify and project the two-dimensional image after it is optically scanned, it is not necessary to change a scanning angle according to a variable power as well as the adverse effect of image strain and the like resulting from adjustment of a projecting position can be reduced.

According to first modifications of the aspects of the present invention, the projection optical system can be simply arranged by disposing the Schlieren aperture to the reflection surface constituting the projection optical system, thereby the number of parts and the cost thereof can be reduced.

According to second modifications of the aspects of the present invention, the field curvature of the two-dimensional image can be corrected in the surface including the light scanning direction.

According to third modifications of the aspects of the present invention, there can be prevented a drawback due to the non-symmetric field angle characteristics that are caused when the field curvature is corrected.

According to fourth modifications of the aspects of the present invention, when the present invention is applied to the light scanning apparatus and the two-dimensional image forming apparatus using the one-dimension modulation device, high image quality can be realized by eliminating factors for deteriorating image quality, and the like.

What is claimed is:

1. A light scanning apparatus comprising:
   a one-dimensional display device having a plurality of light emitting sections or light modulating sections disposed in one direction;
   a projection optical system for forming a projected image by reflecting the light from the one-dimensional display device three times or more; and
   light deflection means for obtaining a two-dimensional image by scanning the light, which is obtained after it is reflected in the projection optical system three times or more, in a surface including a direction perpendicular to the disposing direction of the light emitting sections or the light modulating sections.

2. A light scanning apparatus according to claim 1, wherein the one-dimensional display device comprises a phase reflection type diffraction grating, and a Schlieren aperture is disposed on a reflection surface of an optical element constituting the projection optical system to cut off diffracted light having a particular number of order of the diffracted light diffracted by the phase reflection type diffraction grating.

3. A light scanning apparatus according to claim 1, comprises:
   an optical device interposed between the light deflection means and an image surface of a two-dimensional image obtained by the light deflection means, the optical device having a function for correcting field curvature, which is caused by the light deflection means, in a direction perpendicular to the disposing direction in the one-dimensional display device,
   wherein the optical device has a surface including curvature which is different between a surface including a first direction, which is parallel to the disposing direction of the light emitting sections or the light modulating sections in the one-dimensional display device, and an optical axis direction and a surface including a second direction perpendicular to the first direction and the optical axis direction.

4. A light scanning apparatus according to claim 2, comprises:
   an optical device interposed between the light deflection means and an image surface of a two-dimensional image obtained by the light deflection means, the optical device having a function for correcting field curvature, which is caused by the light deflection means, in a direction perpendicular to the disposing direction in the one-dimensional display device, wherein the optical device has a surface including curvature which is different between a surface including a first direction, which is parallel to the disposing direction of the light emitting sections or the light modulating sections in the one-dimensional display device, and an optical axis direction and a surface including a second direction perpendicular to the first direction and the optical axis direction.

5. A light scanning apparatus according to claim 1, comprising:

an optical device having a Frensnel surface interposed between the light deflection means and an image surface of a two-dimensional image obtained by the light deflection means, wherein the Frensnel surface of the optical device has power in a surface including a first direction, which is parallel to the disposing direction of the light emitting sections or the light modulating sections in the one-dimensional display device, and an optical axis direction or in a surface including a second direction perpendicular to the first direction and the optical axis direction.

6. A light scanning apparatus according to claim 2, comprising:

an optical device having a Frensnel surface interposed between the light deflection means and an image surface of a two-dimensional image obtained by the light deflection means, wherein the Frensnel surface of the optical device has power in a surface including a first direction, which is parallel to the disposing direction of the light emitting sections or the light modulating sections in the one-dimensional display device, and an optical axis direction or in a surface including a second direction perpendicular to the first direction and the optical axis direction.

7. A light scanning apparatus according to claim 1 comprising:

a one-dimensional light modulating device having a plurality of light modulating sections disposed in one direction; and a coherent light source for irradiating light to the one-dimensional light modulating device.

8. A two-dimensional image forming apparatus comprising:

a one-dimensional display device having a plurality of light emitting elements or light modulating elements disposed in one direction;

a projection optical system for forming a projected image by reflecting the light from the one-dimensional display device three times or more;

light deflection means for obtaining a two-dimensional image by scanning the light, which is obtained after it is reflected in the projection optical system three times or more, in a surface including a direction perpendicular to the disposing direction of the light emitting elements or the light modulating elements; and a magnification projecting system for magnifying and projecting the two-dimensional image obtained by the projection optical system and the light defection means using the two-dimensional image as an intermediate image.

9. A two-dimensional image forming apparatus according to claim 8, wherein the one-dimensional display device comprises a phase reflection type diffraction grating, and a Schlieren aperture is disposed on a reflecting surface of an optical element constituting the projection optical system to cut off diffracted light having a particular number of order of the diffracted light diffracted by the phase reflection type diffraction grating.

10. A two-dimensional image forming apparatus according to claim 9, comprising:

an optical device interposed between the light deflection means and an image surface of a two-dimensional image obtained by the light deflection means, the optical device having a function for correcting field curvature, which is caused by the light deflection means, in a direction perpendicular to the disposing direction in the one-dimensional display device, wherein the optical device has a surface including curvature which is different between a surface including a first direction, which is parallel to the disposing direction of the light emitting sections or the light modulating sections in the one-dimensional display device, and an optical axis direction and a surface including a second direction perpendicular to the first direction and the optical axis direction.

11. A two-dimensional image forming apparatus according to claim 8, comprising:

an optical device having a Frensnel surface interposed between the light deflection means and an image surface of a two-dimensional image obtained by the light deflection means, wherein the Frensnel surface of the optical device has power in a surface including a first direction, which is parallel to the disposing direction of the light emitting sections or the light modulating sections in the one-dimensional display device, and an optical axis direction or in a surface including a second direction perpendicular to the first direction and the optical axis direction.

12. A two-dimensional image forming apparatus according to claim 9, comprising:

an optical device having a Frensnel surface interposed between the light deflection means and an image surface of a two-dimensional image obtained by the light deflection means, wherein the Frensnel surface of the optical device has power in a surface including a first direction, which is parallel to the disposing direction of the light emitting sections or the light modulating sections in the one-dimensional display device, and an optical axis direction or in a surface including a second direction perpendicular to the first direction and the optical axis direction.

13. A two-dimensional image forming apparatus according to claim 8, comprising:

an optical device interposed between the light deflection means and an image surface of a two-dimensional image obtained by the light deflection means, the optical device having a function for correcting field curvature, which is caused by the light deflection means, in a direction perpendicular to the disposing direction in the one-dimensional display device, wherein the optical device has a surface including curvature which is different between a surface including a first direction, which is parallel to the disposing direction of the light emitting sections or the light modulating sections in the one-dimensional display device, and an optical axis direction and a surface including a second direction perpendicular to the first direction and the optical axis direction.

14. A two-dimensional image forming apparatus according to claim 8 comprising:
 a one-dimensional light modulating device having a plurality of light modulating sections disposed in one direction; and
 a coherent light source for irradiating light to the one-dimensional light modulating device.

* * * * *